United States Patent [19]

Brudi et al.

[11] 4,198,189
[45] Apr. 15, 1980

[54] LIFT TRUCK ROTATOR WITH PRESSURE-RELIEVED VALVING

[75] Inventors: Ronald A. Brudi; Daniel F. Chase, both of Longview, Wash.

[73] Assignee: Brudi Equipment, Inc., Kelso, Wash.

[21] Appl. No.: 928,590

[22] Filed: Jul. 27, 1978

[51] Int. Cl.² ............................................. B66F 9/18
[52] U.S. Cl. .................................... 414/620; 74/804; 91/176
[58] Field of Search ................... 414/620, 641, 642; 74/86, 804, 805; 91/176, 186, 211, 214, 468, 451, 452, 32

[56] References Cited

U.S. PATENT DOCUMENTS

| | | | |
|---|---|---|---|
| 757,333 | 4/1904 | Moore | 74/804 |
| 1,260,243 | 3/1918 | Moore | 74/804 |
| 1,566,395 | 12/1925 | Gilman | 74/86 X |
| 2,522,128 | 9/1950 | Lehmann | 414/641 |
| 2,623,654 | 12/1952 | Dunham | 414/641 |
| 2,752,055 | 6/1956 | Hoppert | 414/620 |
| 2,837,062 | 6/1958 | Thorpe | 91/176 X |
| 2,928,381 | 3/1960 | Macdonald | 91/186 |
| 2,984,985 | 5/1961 | MacMillin | 414/620 X |
| 3,129,644 | 4/1964 | Andersen | 91/176 X |
| 3,172,332 | 3/1965 | Strickland | 91/32 |
| 3,442,290 | 5/1969 | Phillips | 91/468 X |
| 3,876,100 | 4/1975 | Brudi | 414/620 |

OTHER PUBLICATIONS

Long Reach Manufacturing, Houston, Texas, 2-page brochure, "Long Reach Rotators".

*Primary Examiner*—Stephen G. Kunin
*Assistant Examiner*—Terrance L. Siemens

[57] ABSTRACT

A rotator attachment for rotating a load handling mechanism on a lift truck includes a frame carrying an inner gear with external teeth and rotatable about a longitudinal axis of the truck. An outer gear surrounds the inner gear and has a greater number of internal teeth engaging the external teeth of the inner gear. A pair of double-acting hydraulic cylinders connected to the frame and outer gear are operated in sequence to drive the outer gear in a gyratory eccentric path with respect to such axis so as to rotate the inner gear and a connected load handling attachment about such axis. Control valving responsive to the position of the outer gear in its eccentric path is provided for operating the cylinders in the correct sequence for driving the outer gear. Relief valving is provided in conjunction with the control valving for preventing pressure-locking of the cylinders. The relief valving is responsive to excessive pressure in either side of either cylinder to relieve such excessive pressure through the control valving when the control valving is in a neutral position.

13 Claims, 19 Drawing Figures

FIG. 4
FIG. 5
FIG. 6
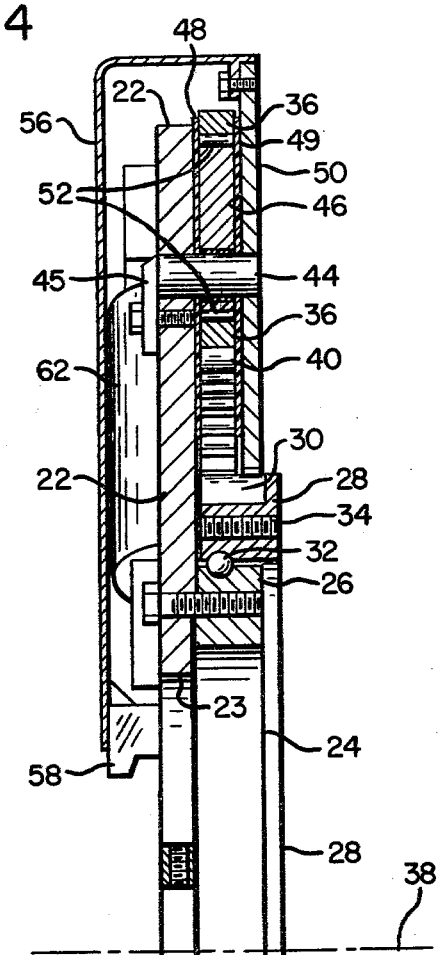
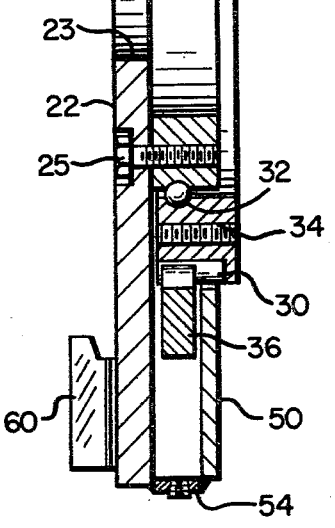
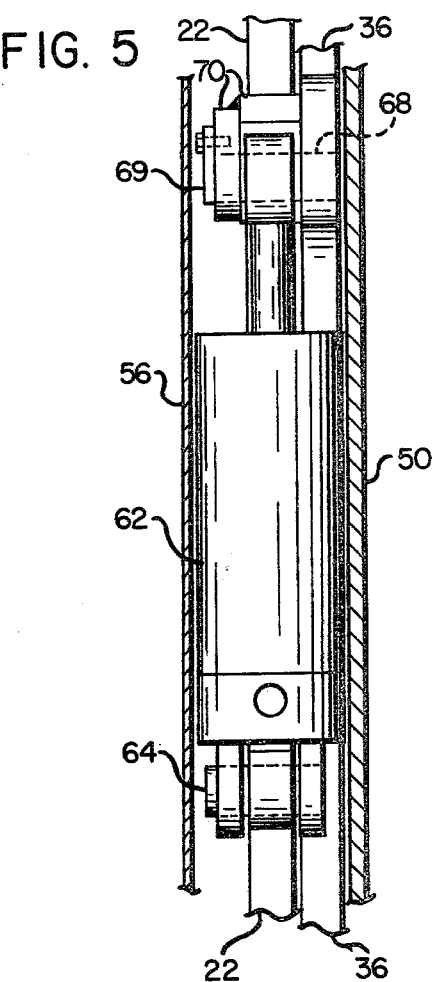
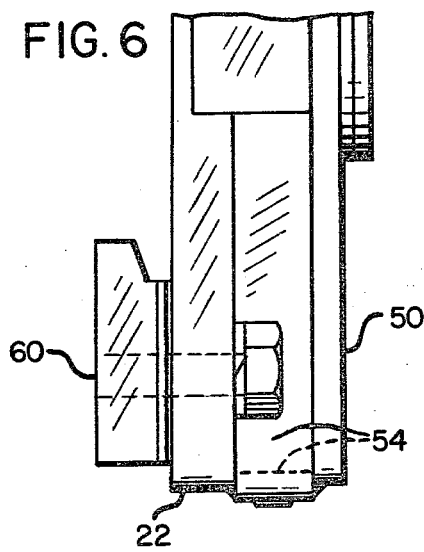

LIFT TRUCK ROTATOR WITH PRESSURE-RELIEVED VALVING

BACKGROUND OF THE INVENTION

1. Field of the Invention

The present invention relates to a rotator attachment for a lift truck in which rotation occurs through the use of multiple hydraulic cylinders to drive a common gear member in a rotary path, and more particularly to such a rotator having pressure-relieved valving for operating the cylinders in correct sequence and for preventing pressure-locking in the cylinders.

2. Description of the Prior Art

The closest known prior art is U.S. Pat. No. 3,876,100, disclosing a rotator for lift truck attachments, of which the present invention is an improvement.

The rotator of such prior patent employs inner and outer gears in surrounding relationship and with the outer gear having internal teeth engaging external teeth of the inner gear, but with the outer gear having a greater number of teeth than the inner gear. One of the two gears is mounted for rotation about an axis. The other gear is driven in a gyratory eccentric path with respect to the one gear so as to rotate the one gear and a connected load-handling attachment.

According to one embodiment of the prior patent, the drive means for achieving the desired gyratory eccentric movement of one of the gears is a series of angularly disposed, double-acting hydraulic cylinders connected at one set of ends to a relatively stationary frame and at the other set of ends to the gear to be driven. The hydraulic cylinders are driven in correct sequence to effectuate the desired gyratory eccentric movement of the gear. Sequencing of the cylinders occurs through use of spool valves connected to the cylinders and shifting in response to cylinder oscillation. The spool valves are basically three-position valves, including a center neutral position between two operating positions. The problem with this arrangement is that when one driving cylinder is in or near its maximum power position another driving cylinder is in or near a bottom or top dead-center position, changing from a retraction to an extension mode, or vice versa. In such transitional positions of the inactive cylinder, its associated control valve is passing through its flow-blocking position. Yet, the inactive cylinder is still being driven by the powered cylinder. Therefore, excessive fluid pressure bluids up on one side of the inactive cylinder as it tries to retract or extend with its control valve in a neutral position. This so-called pressure-locking in the inactive cylinder can break its piston rod unless the excessive pressure is relieved. To avoid pressure-locking in the drive cylinders of the prior patent, a bleed orifice is provided in the valve spool of the control valve for each cylinder. This orifice allows enough flow between the opposite side of each cylinder to prevent excessive pressure buildup in the cylinder. Such orifices are shown at 120 and 121 in the valve spools 82, 88 in FIG. 5 of the aforementioned patent. While the use of such a constant bleed path between opposite sides of each cylinder in theory should be an adequate solution to the pressure-locking problem, in practice it has been found to be unsatisfactory because of the difficulty in maintaining an adequate working pressure in the hydraulic system.

Accordingly, there is a need in hydraulic cylinder-driven rotators of the type described to provide an improved means for preventing pressure locking of the cylinders when they change modes.

Also, in rotators of the described inner-outer gear type, as disclosed in the aforesaid prior patent, there is a need to reduce the bulk and weight of the rotator so as to increase the maximum pay load of the lift truck. For example, in the hydraulic cylinder-driven version of the rotator shown in FIG. 2 of the aforementioned patent, four hydraulic cylinders, each with a separate control valve assembly, and four eccentric mountings are used to drive the outer gear plate of the rotator. This produces excessive bulk and weight. The prior patent suggests that a few as two double-acting hydraulic cyliners would be sufficient to drive one of the gears of the rotator in a gyrotary eccentric path. Although this is true, how it could be accomplished is not disclosed. Accordingly, there is a need to provide a rotator of the inner-outer gear type described with minimum weight and bulk for optimum payload.

SUMMARY OF THE INVENTION

The present invention is an improvement in a rotator of the type shown in prior U.S. Pat. No. 3,876,100 in that eccentric gear of the rotator is driven by hydraulic cylinders which overcome the pressure locking problem inherent in such devices without loss of working pressure through the use of pressure-relieved valving, which becomes activated only when excessive cylinder pressure is sensed.

The present invention is also an improvement over prior rotators of the type described in minimizing the weight and bulk of the rotator through a compact arrangement which employs only two drive cylinders, and which incorporates the control valves for sequencing such cylinders, either in the bases of such cylinders or in a single rotary control valve driven from one of the rotary elements of the device.

Accordingly, a primary object of the present invention is to eliminate the pressure-locking problem of drive cylinders of eccentric gear-driven rotators without reduction of working pressure in the hydraulic system.

Another primary object of the invention is to reduce the bulk and weight of rotators of the eccentrically driven gear type.

A more specific object is to solve the pressure-locking problem in the drive cylinders of a rotator by using pressure-relieved valving in conjunction with the control valves for sequencing such cylinders.

Another specific object is to reduce the bulk and weight of a rotator as aforesaid by using only two double-acting hydraulic cylinders to drive the eccentric gear.

Another specific object is to reduce the bulk and weight of a rotator as described by incorporating the control valving for the hydraulic cylinders within the hydraulic cylinders themselves.

Another specific object is to reduce the bulk and weight of a rotator as described by using a single rotary control valve for controlling the sequencing of both cylinders, with such rotary valve having a built-in high pressure relief valving to prevent pressure locking of the controlled cylinders.

The foregoing objects, features and advantages of the present invention will become more apparent from the following detailed description which proceeds with reference to the accompanying drawings.

BRIEF DESCRIPTION OF DRAWINGS

In the drawings:

FIG 4 is a vertical sectional view taken along the Line 4—4 of FIG. 2;

FIG. 5 is a sectional view taken along the Line 5—5 of FIG. 2;

FIG. 6 is a side view of a lower portion of the rotator of FIG. 2 as viewed from the Line 6—6 of FIG. 2;

DETAILED DESCRIPTION OF PREFERRED EMBODIMENT

Rotator Assembly

Figure 1:
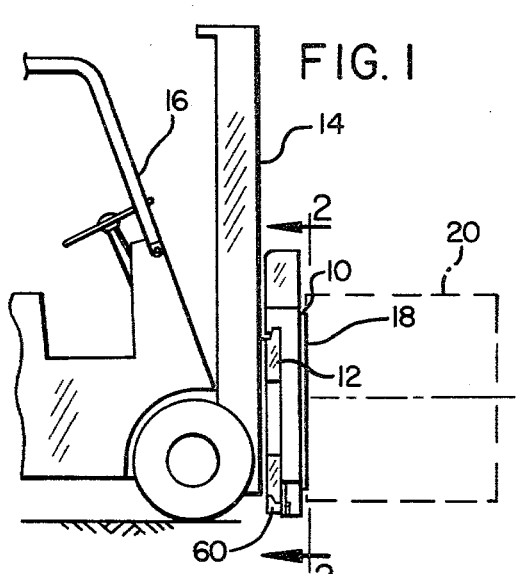
FIG. 1 is a side elevational view of a front portion of a lift truck having a rotator of the invention attached thereto.

With reference to the drawings, the rotator attachment 10 of the invention is shown in FIG. 1 connected to the vertically movable carriage 12 of the mast assembly 14 of a conventional lift truck 16. Rotator 10 has a load handling attachment 18 connected to its front face for handling a load, shown in phantom lines at 20.

Figure 2:
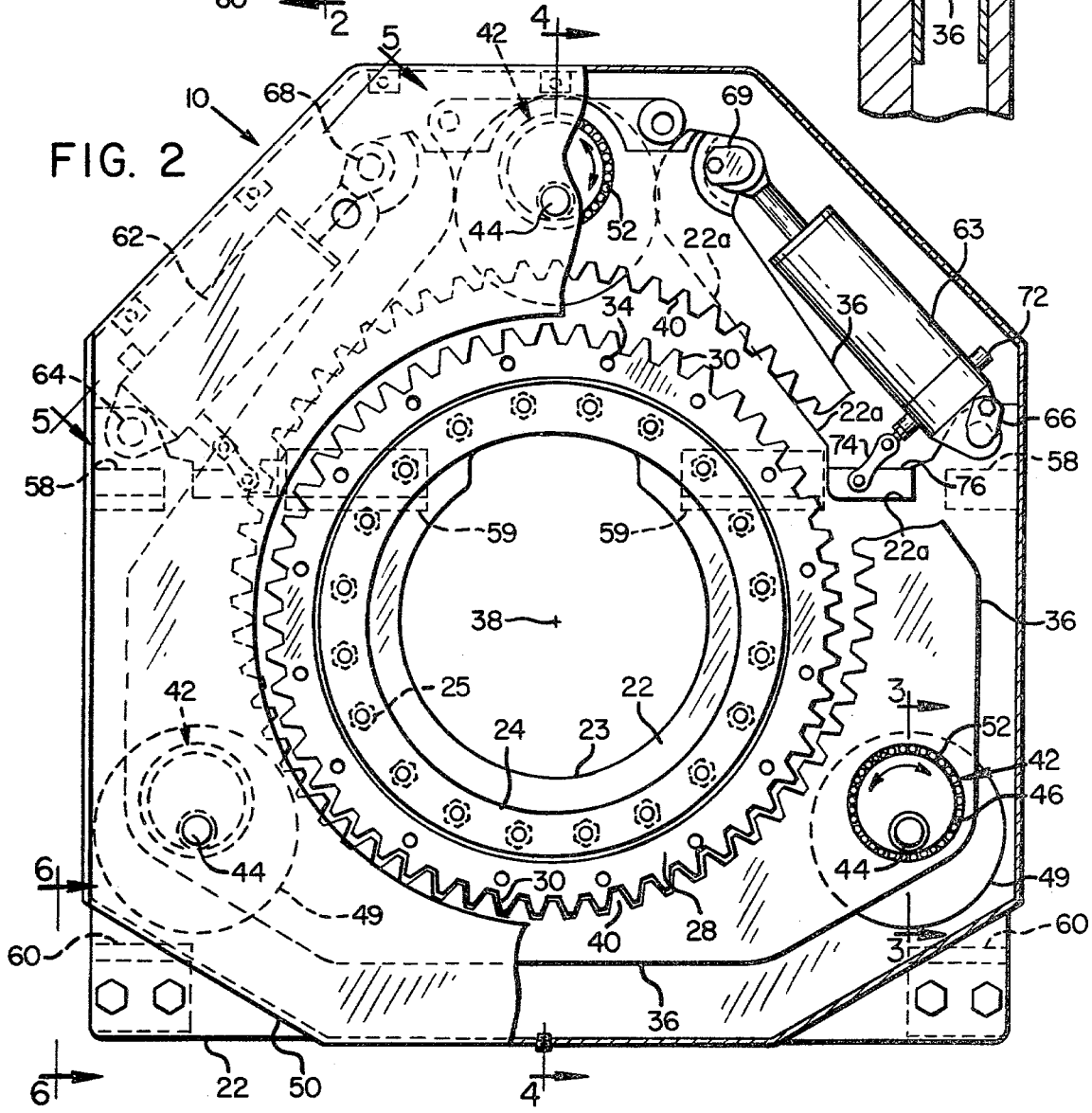
FIG. 2 is a front elevational view of the rotator of FIG. 1 on an enlarged scale and with portions broken away for clarity.

Referring particularly to FIGS. 2 and 4, the rotator attachment 10 has a main frame plate 22 with a center opening 23. Frame plate 22 mounts a hub 24 on its front face in surrounding relationship to its opening 23, using threaded fasteners 25.

The radially outer periphery of the hub provides a rotational mounting means in the form of an inner race 26 for rotatably mounting an inner gear means in the form of a gear ring 28, having external teeth 30. The inner gear ring 28 is rotatably mounted on hub 24 by roller bearings 32. The front face of inner gear ring 28 has circumferentially spaced threaded openings 34 providing a means for attaching a load handling attachment to it so that when the inner gear ring is rotated by means to be described, the connected load handling attachment is also rotated.

An outer gear means in the form of a gear plate 36 is mounted in surrounding relationship to the inner gear ring 28 and to the longitudinal axis of rotation 38 of the inner gear ring. Outer gear plate 36 has internal gear teeth 40 sized and shaped, and thus adapted, to mesh with the external teeth 30 of the inner gear ring. However, there are a greater number of internal teeth on the outer gear plate than there are external teeth on the inner gear ring. Thus, as shown in FIGS. 2 and 4, the internal teeth of the outer gear plate engage the external teeth of the inner gear ring at only one portion of the inner gear ring at a time, such as at the lower portion of the latter as shown in FIGS. 2 and 4.

Figure 3:
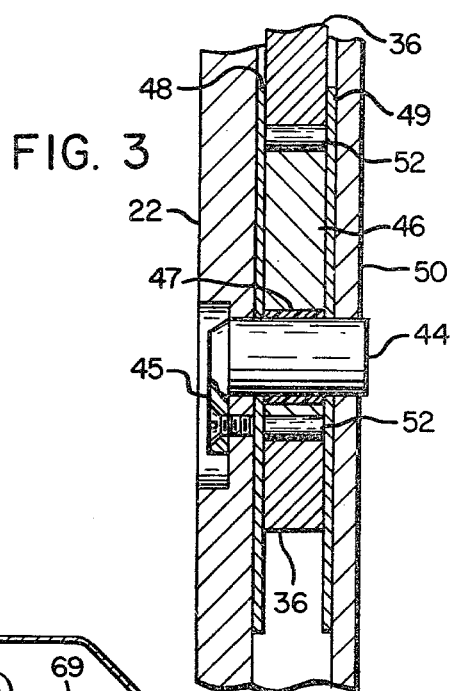
FIG. 3 is a vertical sectional view taken along the Line 3—3 of FIG. 2.

The outer gear plate 36 is mounted to the front face of frame plate 22 by three eccentric mounting means, indicated generally at 42, which are symmetrically arranged about the axis of rotation 38 of the inner gear. With reference to FIGS. 2, 3 and 4, each eccentric mounting means includes a pivot pin 44 anchored to frame plate 22 by a pivot pin anchor 45, shown in FIG. 3. An eccentric pivot 46 is eccentrically and rotatably mounted in a bushing 47 on pivot pin 44 between thrust washers 48, 49 which separate the eccentric pivot and outer gear from frame plate 22 and from a front cover plate 50. Eccentric pivot 46 is also rotatably mounted in outer gear plate 36 by roller bearings 52. Thus, the outer gear plate is rotatably mounted by the eccentric pivots 46 for movement in a gyrotary eccentric path with respect to the inner gear ring 24 and its axis of rotation 38. According to a well-known principle, movement of the outer gear in such path through each cycle causes the engaged inner gear to rotate through an angle of less than 360° which corresponds to the difference between the number of teeth on the two gears.

Front cover plate 50 covers outer gear plate 36 throughout the extent of the latter and in surrounding relationship to the inner gear ring and hub. Front cover plate 50 is connected to frame plate 22 at the bottom of the rotator attachment by a block 54 and at the upper end portion of the rotator by a back cover plate 56. The back plate extends from the front plate over the top of the rotator attachment and then downwardly behind frame plate 22. The back cover plate terminates at a lower end above the rotational axis 38 where it is connected to the opposite sides of frame plate 22 by upper hook blocks 58.

Hook blocks 58 are attached to the back of frame plate 22 at its opposite sides above rotational axis 38 to provide a means for mounting the rotator attachment on the lift carriage of a lift truck. To accomplish this, blocks 58 are hooked over the upper edge of the typical lift carriage 12 as shown in FIG. 1. The rear face of the frame plate 22 near its lower end mounts a pair of lower hook members 60, which are adapted to hook over the lower edge of lift carriage 12, also in the manner shown in FIG. 1. As shown in FIG. 2, there is a second pair of upper hooks 59 inwardly of hooks 58 for attachment of the rotator to the lift truck carriage. Hooks 59 are also fixed to the back of frame plate 22 to help hooks 58 bear the vertical loading of the rotator assembly and its connected load-handling attachment and payload.

Back cover plate 56, together with the upper reaches of front cover plate 50 provide a housing within which the drive means for driving the outer gear in its gyrotary eccentric path is mounted. Such drive means comprises the two double-acting hydraulic cylinders 62, 63 shown best in FIG. 2. The frame plate 22a is cut away along the edge portions 22a on both sides thereof as shown in FIG. 2, to accommodate such drive cylinders between the front and back cover plates.

Rotator Drive

Figures 7, 8:
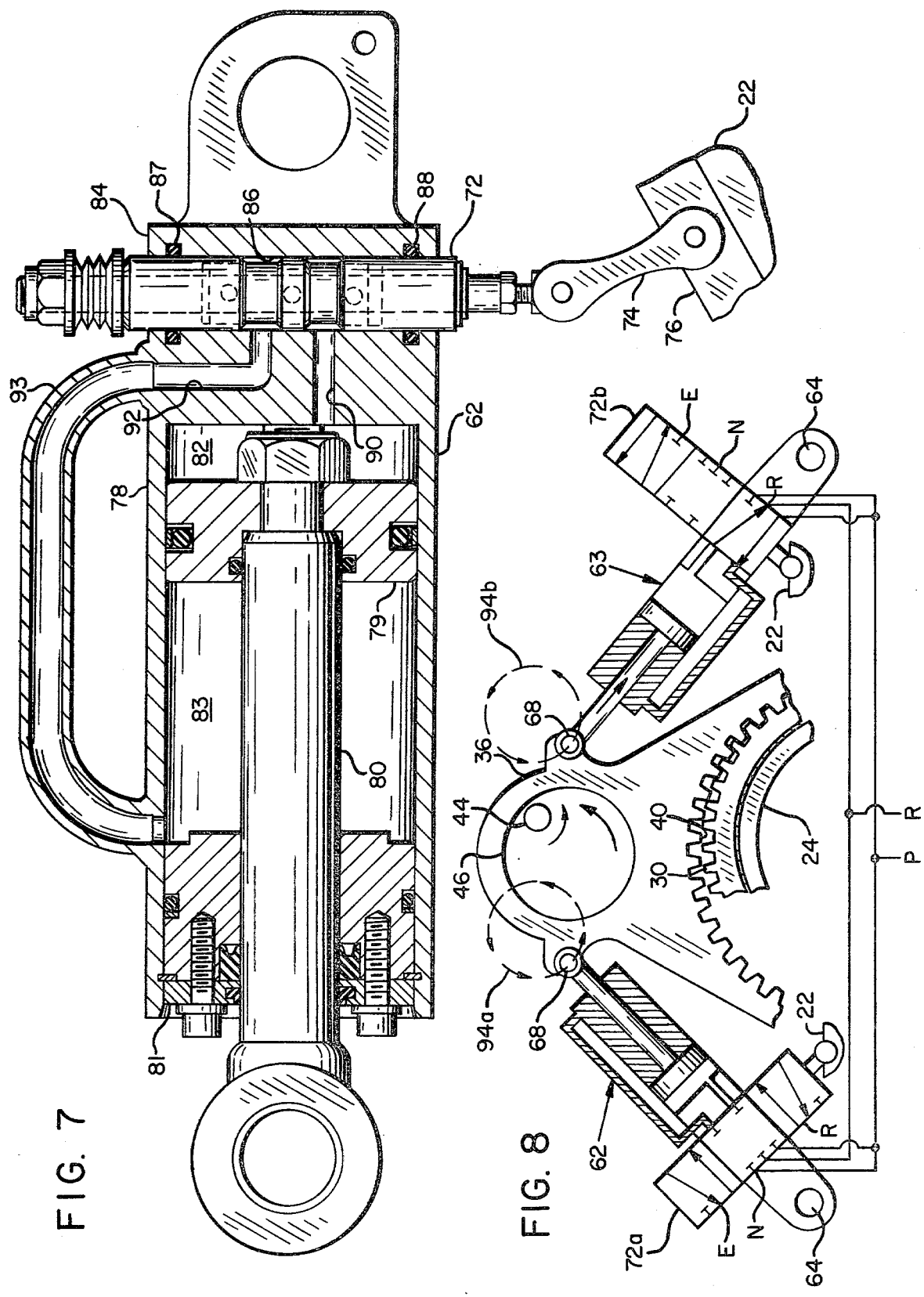
FIG. 7 is a longitudinal sectional view through one of the drive cylinders of the rotator such as the drive cylinder shown in FIG. 5.
FIG. 8 is a schematic view illustrating the drive arrangement of the invention and the cylinder pressure-locking problem inherent in such drive systems.

Referring especially to FIGS. 2, 5 and 7, the two hydraulic cylinders 62, 63, providing the drive means for the eccentrically drive gear plate 36, are pivoted at one set of ends, specifically their bases, by pins 64 to opposite sides of frame plate 22 at cutaway portions 22a. Pins 64 are anchored to the frame plate 22 by pin anchors 66, one of which is shown at the right-hand side of FIG. 2. The other set of ends, specifically the piston rod ends, of cylinders 62, 63 are provided by pins 68 to opposite upper end portions of outer gear plate 36. Pins 68 are anchored by pin anchors 69, one of which is shown in FIG. 5, to a rearwardly projecting mounting bracket portion 70 of outer gear plate 36. As thus mounted, cylinders 62 and 63 are disposed at generally right angles to one another, as shown best in FIG. 2. As the two cylinders extend and retract in proper sequence to drive outer gear 36 in a rotary path about eccentric pins 44, the cylinders will oscillate about their respective pivot pins 64 on the frame plate 22.

The described oscillating movement of drive cylinders 62, 63 is used to position control valve means for proper sequencing of the cylinders to effect the desired movement of outer gear 36. Such cylinder position-responsive control valve means are shown, for example, in FIGS. 2 and 7, and comprise in the embodiment there shown a control valve spool 72 mounted for movement relative to an associated cylinder within the base of such cylinder. One end of each control valve spool 72 is connected by a link 74 to a mounting bar 76 on frame plate 22. Thus, oscillation of cylinders 62, 63 causes relative movement between such cylinders and their associated valve spools 72 and causes the desired positioning of such spools.

As shown in FIG. 7 with respect to cylinder 62, each drive cylinder 62, 63 includes a cylinder casing 78, a piston 79 mounted for reciprocation within such casing and a piston rod 80 connected to the piston for reciprocation therewith and extending through an outer end portion 81 of the casing. Piston 79 divides the interior chamber of the casing into a primary side 82 and a secondary side 83, the primary side being the side with the greatest piston area. Each cylinder has a base portion 84, which defines the body portion of the control valve assembly of which the valve spool 72 is a part. Valve body 84 includes a spool cavity or bore 86, which slidably receives the valve spool 72 and is provided with suitable fluid sealing means 87, 88. Cylinder fluid passage means extend within body or base portion 84 from cavity 86 and are connected to the opposite sides of the cylinder chamber. Such cylinder passage means include a first cylinder passage 90 connected to the primary side of the cylinder and a second cylinder passage 92 connected by an external passage portion 93 to the secondary side 83 of the cylinder. Cavity 86 is also in communication with a source of fluid under operating pressure and with a fluid relief passage (not shown). Thus, with appropriate positioning of valve spools 72 fluid passages 90 and 92 are alternately placed in communication with the source of fluid pressure to reciprocate piston 79 and piston rod 80 to drive outer gear 36.

The Cylinder Pressure-Locking Problem

FIG. 8 illustrates the problem of pressure locking in the cylinders 62, 63 inherent when such cylinders are used sequentially to induce a rotary motion in a common body to which the two cylinders are connected, namely, the outer gear plate 36. The rotary motion induced in the outer gear member 36 is illustrated by the paths 94a, 94b traced by the pivot pins 68 of the two drive cylinders 62, 63. Because outer gear plate 36 is connected to frame plate 22 through the eccentric pivot 46 and pivot pin 44, the circular paths traced by cylinder pins 68 are translated to a gyrotary eccentric motion about the axis of inner gear 30.

In FIG. 8 the control valve spools 72a and 72b of drive cylinders 62, 63 are connected at one end of each to main frame plate 22 as previously described. Each spool valve is essentially a three-position valve, including a neutral center position N which each spool must pass through as its cylinder oscillates between a cylinder-extending position E and a cylinder-retracting position R.

Cylinder 63 is shown approximately in its maximum power position, retracting under power at the same time cylinder 62 is in approximately its bottom dead center position, changing from its retracting to its extending mode while its control valve 72a is moving through its neutral, flow-blocking position. The pressure-locking problem develops in cylinder 62 when cylinder 63 continues to retract under power, moving outer gear 36 in a direction tending to extend cylinder 62. Since control valve 72a of cylinder 62 is moving through its neutral flow-blocking position in which fluid is locked in the cylinder, the resulting pressure buildup in its secondary side is likely to break its piston rod unless the excessive pressure is relieved.

This is an inherent problem in position-responsive sequencing valves used to operate two or more hydraulic cylinders in sequence to rotate a common body. Cylinder 63 will experience the same problem when its control valve 72b moves through its transient neutral position N, which occurs when cylinder 62 is in its maximum power position, either while extending or retracting.

A solution to this pressure-locking problem which does not reduce working pressure is a major feature of the present invention. The solution includes the provision of pressure relieved control valving for sequencing the drive cylinders.

Pressure Relieved Control Valving

Referring to FIGS. 9-12, the control valve 72 of FIG. 7 is shown in its preferred embodiment. As in FIG. 7, valve spool 72 is mounted within valve body 84, and more specifically, within spool cavity 86 of such body. Cylinder fluid passages 90, 92 from such cavity connect with the primary and secondary sides, respectively, of the associated drive cylinder. The valve body also includes pressure fluid passages 96, 98, leading from a source of fluid under operating pressure into communication with spool cavity 86, and a relief passage 100, leading from spool cavity 86 and the valve body to a low pressure fluid reservoir or other low pressure source.

Valve spool 72 comprises three axially separable spool sections including a pair of end sections 102, 104, separated by a central spool section 103. All three sections are slidably mounted on a spool rod 106, one end extension 107 of which projects from one end of spool assembly 72 for connection to the link 74 which connects the valve spool to frame plate 22. Rod end portion 107 also receives a snap ring 108, against which spool end portion 102 abuts. An opposite end extension 109 of spool rod 106 is threaded to receive a nut 110. Between the nut and spool end portion 104 six dished disc (Belleville) springs 112 are assembled in abutting relationship on the spool rod 106. The springs are also sandwiched between a pair of flat washers 114, 115. Nut 10 is threaded onto rod end 109 until springs 112 are placed in slight compression, thereby preloading spool sections 102, 103, 104 against snap ring 108.

Figure 12:
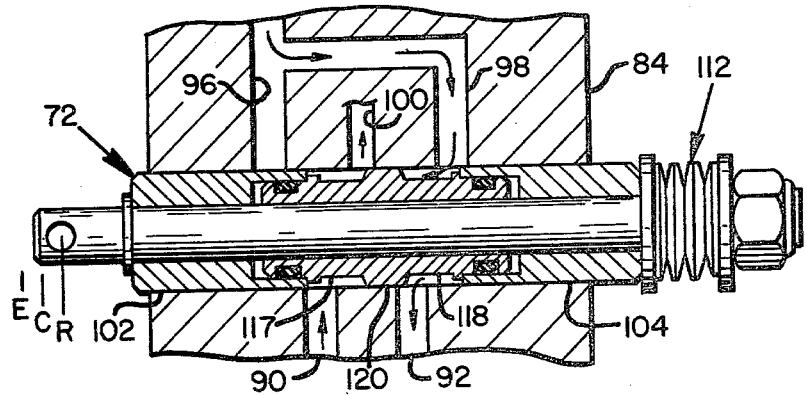
FIG. 12 is a view similar to FIGS. 9, 10 and 11, showing the valve in its cylinder-retracting position.

Center spool section 103 has a pair of annular grooves 117, 118 separated axially by a land 120 at one side of each groove and by an annular inner end wall 122, 123 of the spool end sections 102, 104, respectively, at the other side. Center spool section 103 also has a pair of annular shoulders 125, 126 which normally are in abutment against the annular inner end walls 122, 123, respectively, of spool end sections 102, 104, as shown in FIGS. 9, 10 and 12.

Spool end sections 102, 104 also have recessed inner end portions 128, 129, respectively, which receive the opposite outer end portions of center spool section 103 outwardly of shoulders 125, 126. The opposite end portions of the center spool section have annular grooves, each of which receives an O-ring seal 130, providing a fluid seal between the center spool section and the two end spool sections.

Figure 9:
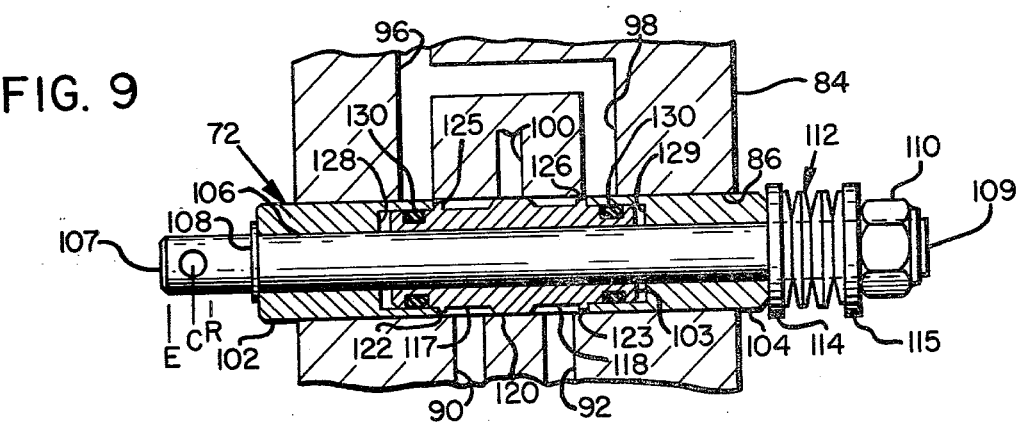
FIG. 9 is a longitudinal sectional view through a spool-type control valve of the invention with built-in pressure relief, such valve being shown in its neutral position.

When valve spool 72 is in its neutral position shown in FIG. 9, land 120 of center spool section 103 blocks relief passage 100 in the valve body, thereby preventing flow of fluid from the opposite sides of the associated cylinder through cylinder passages 90, 92. At the same time annular grooves 117, 118 of the center spool section are in communication with the cylinder fluid passages 90, 92, but are blocked from pressure passages 96, 98 by spool end sections 102, 104, thereby preventing pressurization of the opposite sides of the associated cylinder.

Figure 10:
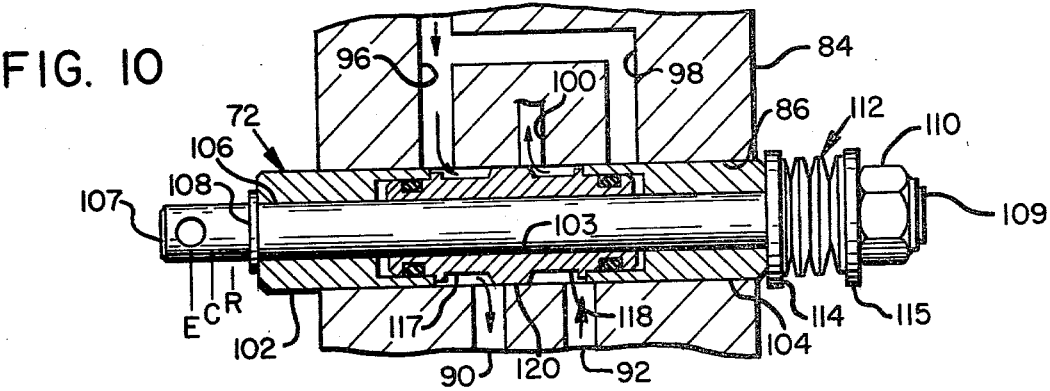
FIG. 10 is a view similar to FIG. 9, but showing the valve in its cylinder-extending position.

In FIG. 10 spool 72 has shifted relative to valve body 84 to a cylinder-extending position wherein fluid under operating pressure is transmitted through spool groove 117 and cylinder passage 90 to the primary side of the cylinder. At the same time fluid exhausted from the secondary side of the cylinder passes through cylinder passage 92 and spool groove 118 to relief passage 100, enabling the cylinder to extend.

In the cylinder-extending position of valve spool 72, spring 112 is not compressed from its condition as shown in FIG. 9. Also, the three separate spool sections 102, 103, 104 have shifted relative to the valve body as a unit, remaining in abutment with one another.

FIG. 12 shows valve spool 72 in its cylinder-retracting position. As in its cylinder extending position of FIG. 10, spool sections 102, 103 and 104 in FIG. 12 have shifted as a unit relative to the valve body 84 to index spool groove 118 with pressure passage 98 and cylinder passage 92, and spool groove 117 with cylinder passage 90 and relief passage 100, whereby the associated cylinder retracts.

Figure 11:
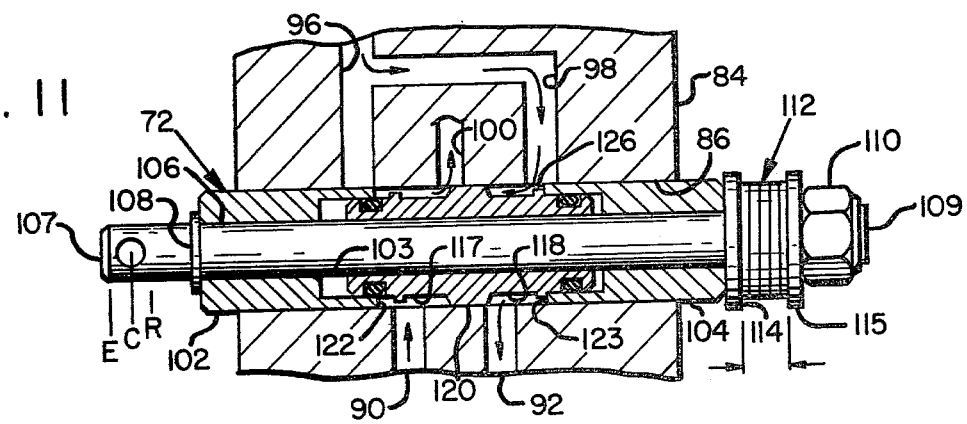
FIG. 11 is a view similar to FIGS. 9 and 10, but showing the vave in its centered neutral position under pressure relief.

In FIG. 11 valve spool 72 is shown in its centered neutral position, but in a high pressure-relief condition for relieving the pressure-locking condition illustrated with respect to the cylinder 62 in FIG. 8. In such neutral position, pressure passages 96, 98 and the relief passage 100 are normally blocked from communication with spool grooves 117, 118, as shown in FIG. 9. However, when either side of the cylinder, such as the primary side illustrated in FIG. 11, experiences an excessively high fluid pressure indicative of a pressure-locking condition, such pressure is transmitted through cylinder passage 90 to spool groove 117. The excessive pressure is exerted against the opposite side walls of groove 117. One of such opposite side walls 122, is the inner end wall of spool end section 102, and cannot move axially under such pressure because such spool section abuts snap ring 108. However, the opposite side wall of groove 117 is formed by land 120 of the center spool section, which can move against the pressure of springs 112. Thus, the excessive fluid pressure working within groove 117 and against side wall of land 120 shifts center spool section 103 toward the right in FIG. 11, shifting the abutting spool end section 104 with it to compress springs 112. When the center spool section shifts, spool groove 117 indexes with relief passage 100 while remaining indexed with cylinder passage 90, thereby relieving the excessive pressure at the primary side of the associated cylinder. At the same time, spool groove 118 indexes with pressure passage 98 and cylinder passage 92, allowing fluid under operating pressure to enter the secondary side of the cylinder and thereby prevent cavitation.

When the excessive pressure in the cylinder is relieved, springs 112 force the center and end spool sections 103, 104 back to their normal, neutral positions as shown in FIG. 9.

If the excessive pressure is in the opposite, secondary side of the associated cylinder so that such excessive pressure is transmitted through cylinder passage 92 to spool groove 118, rather than to spool groove 117, the action of spool 72 in relieving such excessive pressure is somewhat different from that previously described. Excessive pressure working in groove 118 is exerted against the end wall 123 of spool end member 104, shifting end spool section 104 toward the right in FIG. 11 to compress springs 112 and index groove 118 with pressure passage 98, whereby excessive pressure in the cylinder and cylinder passage 92, which is higher than working pressure, will be relieved through pressure passage 98. Center spool section 103 does not move because the excess pressure in groove 118 working against land 120 maintains the center section in abutment against end section 102.

Thus, regardless of which side of the cylinder is under excessive pressure, one or more of the spool sections of spool 72 will react to relieve such excessive pressure. Springs 112 are preferably selected to exert a spring pressure which is slightly above the working pressure of the hydraulic system.

First Modified Control-Relief Valving

Figure 13:
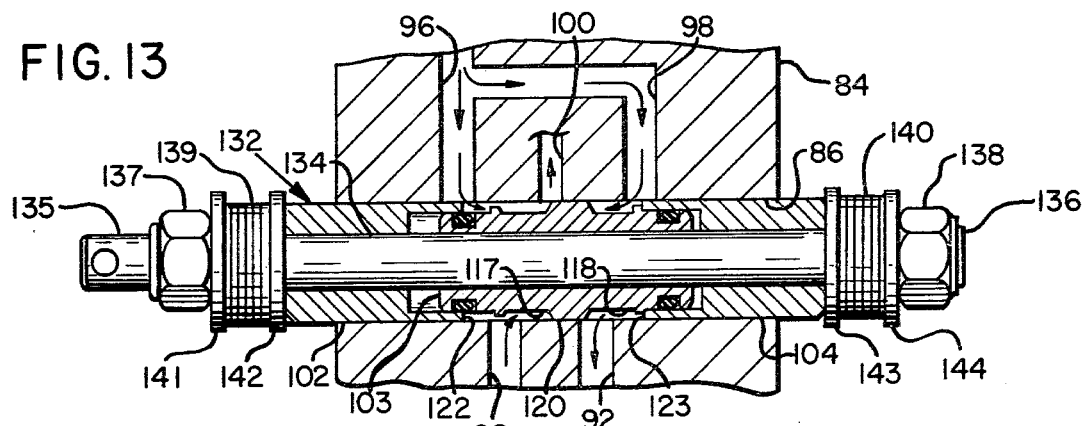
FIGS. 13 and 14 are similar views of a first modified form of spool-type control valve in accordance with the invention, both views showing the valve in a neutral pressure-relieved condition.
Figure 14:
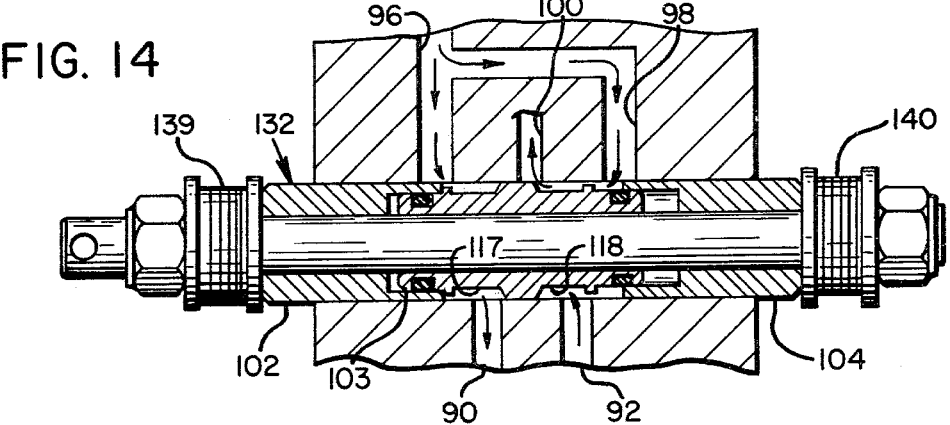

FIGS. 13 and 14 show a modified combination control and relief valve of the spool type. The valve body of the FIG. 13 form of control valve is identical to the valve body of the FIGS. 9-12 form, and therefore the same reference numbers are used on both valve bodies. The valve spool assembly 132 of FIGS. 13 and 14 is only slightly different from the valve spool assembly 72 of FIGS. 9-12, the only difference being that in FIGS. 13-14 the axially separable valve spool sections 102, 103, 104, which are identical to the corresponding valve spool sections of FIGS. 9-12, are spring-loaded at both ends, rather than at only one end. More specifically, valve spool sections 102, 103, 104 in FIGS. 13-14 are mounted on a spool rod 134 having projecting threaded end portions 135, 136 onto which nuts 137, 138 are threaded to preload Belleville spring assemblies 139, 140 between flat washers 141, 142 at one end and 143, 144 at the opposite end.

In both FIGS. 13 and 14 valve spool 132 is shown in its spring-centered neutral position, which is the only position in which the action of such valve differs from the action of 72 in FIGS. 9-12.

Normally, when valve spool 132 is in its centeredneutral position with no excessive fluid pressure at either side of the associated cylinder, spool center section 103 is in exactly the same position as shown in FIG. 9, with land 120 indexed with relief passage 100 to block return flow from both sides of the associated cylinder to the relief passage. Spool end sections 102, 104 block pressure passages 96, 98 from communication with cylinder passages 90, 92, also exactly as shown in FIG. 9.

However, as shown in FIG. 13, excessive pressure at the primary side of the associated cylinder is transmitted through cylinder passage 90 and spool groove 117. This excessive pressure works against the opposite side walls of groove 117, causing center spool section 103 and end spool section 104 to shift to the right in FIG. 13, while at the same time the end spool section 102 shifts to the left, compressing both sets of springs 139, 140, and indexing spool groove 117 with relief passage 100 to relieve excess fluid pressure at the primary side of the cylinder. At the same time spool groove 118 indexes with pressure passage 98, thereby admitting fluid from the pressure passage through groove 118 and cylinder passage 92 to the secondary side of the cylinder to prevent cavitation as the cylinder extends.

FIG. 14 illustrates the neutral position of valve spool 132 when the secondary side of the associated cylinder is under excessive pressure. When this occurs, excessive pressure in the secondary side of the cylinder is transmitted through cylinder passage 92 to spool groove 118 and works against the opposite sides of the groove. As a result, spool end section 104 shifts to the right in FIG. 14 to compress springs 140, and spool center section 103 and end section 102 shift to the left to compress springs 139. Under such relief condition spool groove 118 indexes both with pressure passage 98 and relief passage 100, whereby excessive pressure is relieved through cylinder passage 92 to relief passage 100, and fluid under operating pressure passes through groove 118 from pressure passage 98 to relief passage 100. At the same time groove 117 indexes with pressure passage 96 to admit pressure fluid into cylinder passage 90 to prevent cavitation in the cylinder as it extends.

In either the relief condition shown in FIG. 13 or the relief condition shown in FIG. 14 the spool sections return to their normal positions under the influence of spring sets 139 and 140 when the excessive pressure condition is relieved.

Second Modified Control-Relief Valving

Figure 15:
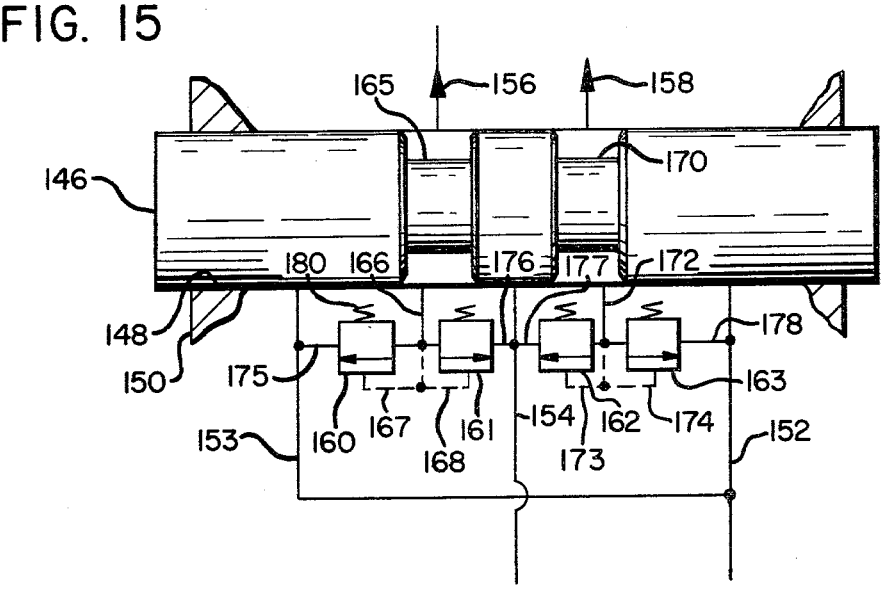
FIG. 15 is a schematic view of a second modified form of spool-type control valve with pressure relief in acccordance with the invention.

FIG. 15 shows schematically a second modified form of combination control and relief valve assembly for controlling the sequencing of an associated hydraulic cylinder. Such a valve modification could be used instead of the spool valve embodiments of FIGS. 9-12 or 13-14 in the drive cylinders 62, 63.

In this embodiment a one-piece valve spool 146 is mounted within a spool cavity 148 of a valve body 150 for relative movement between the spool and body. The body includes pressure passages 152, 153 connected to a common source of fluid under operating pressure and to spool cavity 148. The valve body also includes a relief passage 154. Cylinder passages 156, 158 within the valve body are connected to opposite sides of an associated hydraulic cylinder (not shown).

Spool 146 is a three-position spool shown in its neutral position in which pressure passages 152 and 153 are blocked from communication with cylinder passages 156, 158 and relief passage 154 is similarly blocked from the same cylinder passages.

Mounted within the valve body 150 are two pairs of pilot operated relief valve members, including a first pair of relief valve members 160, 161 and a second pair of relief valve members 162, 163. In the neutral position of valve spool 146, relief valve members 160 and 161 are in communication with cylinder passage 156 through a spool groove 165, fluid passage 166 and pilot passages 167, 168. Also, with spool 146 in its neutral position, cylinder passage 158 is in communication with relief valve members 162, 163 through a spool valve groove 170, fluid passage 172 and pilot passages 173, 174. The relief valve member 160 is also in communication with pressure passage 153 through a fluid passage 175. Relief valve member 161 is in fluid communication with relief passage 154 through a passage 176. Relief member 162 is in fluid communication with relief passage 154 through fluid passage 177. Relief valve member 163 is in fluid communication with pressure passage 152 through fluid passage 178. Relief valve members 160-163 are normally maintained in their closed positions by springs 180.

With spool 146 in its neutral position shown, and one side of the associated cylinder under excessive pressure, such pressure is transmitted through cylinder passage 156, spool groove 165, relief passage 166 and pilot passages 167, 168 to relief valve members 160, 161. The excessive pressure shifts such members against the lower pressure of springs 180 to open such valve members to communication with pressure line 153 and relief passage 154, respectively, thereby relieving the excessive pressure through valve members 160, 161. When the excess pressure is relieved, the lower pressure is sensed by the valve members 160, 161 through pilot passages 167, 168, whereby such valve members are closed by their respective springs 180.

Relief valves 162, 163 operate in a similar manner when excessive pressure develops in the opposite side of the associated cylinder. The excessive pressure is transmitted through cylinder passage 158, spool groove 170, relief passage 172, and pilot passages 173, 174, to open relief valve members 162, 163 to communication with relief passage 154 and pressure passage 152, thereby relieving the excess pressure in the cylinder.

From a comparison of the spool valves of FIGS. 9 and 13 with the spool valve of FIG. 15, it will be apparent that the latter valve assembly incorporates the relief valve function in the valve body, whereas the former spool valve assemblies incorporate the relief function within the valve spool. However, in either case the cooperation of the control valve spool is necessary for operation of the relief valve.

Third Modified Control-Relief Valving

FIGS. 16–19 illustrate a third modified form of control-relief valving in the form of a rotary valve assembly with a rotary control valve member with built-in relief valving. Unlike the prior spool-type control valves, the single rotary valve as shown can be used to control the sequencing of both sides of both cylinders 62, 63.

Figure 16:
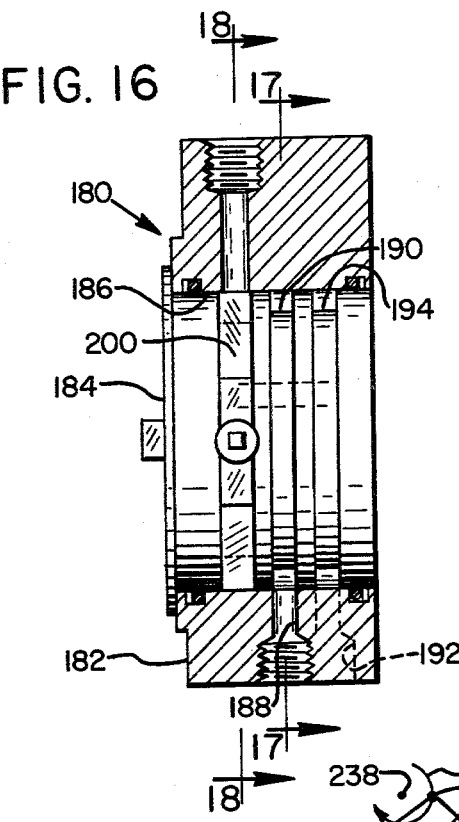
FIG. 16 is a vertical sectional view through a rotary control valve, which is a third modified form of control valve in accordance with the invention.

The rotary control valve assembly illustrated generally at 180 in FIG. 16 includes a relatively stationary valve block 182 and a generally cylindrical rotary valve member, or rotor, 184 rotatably mounted within a cylindrical bore 186 through the valve block.

Valve block 182 includes a pressure fluid passage 188 connected to a source of fluid under operating pressure and extending into communication with valve bore 186 at an annular groove 190 of rotor 184. A relief fluid passage 192 in the valve block is connected to a source of low pressure fluid and communicates with valve bore 186 at a second annular groove 194 of rotor 184. The valve block also includes four aligned cylinder passages 196, 197, 198, 199, the passages 196, 198 being connected respectively to the primary and secondary sides of double-acting hydraulic drive cylinder 62a, shown schematically in FIGS. 18 and 19. The cylinder passages 197, 199 are connected, respectively, to the secondary and primary sides of the other drive cylinder 63a, also shown schematically in FIGS. 18 and 19.

In addition to the annular grooves 190, 194, rotor 184 has a recessed distributor portion 200, separated axially from grooves 190 and 194, and aligned with cylinder passages 196–199, as shown in FIG. 16.

Figure 18:
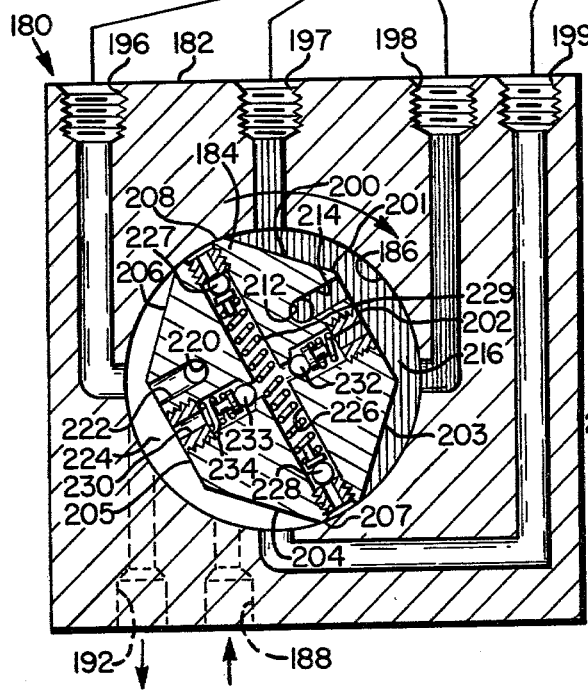
FIG. 18 is a sectional and partially schematic view taken along the Line 18—18 of FIG. 16, showing the rotary control valve in a first operating position.
Figure 19:
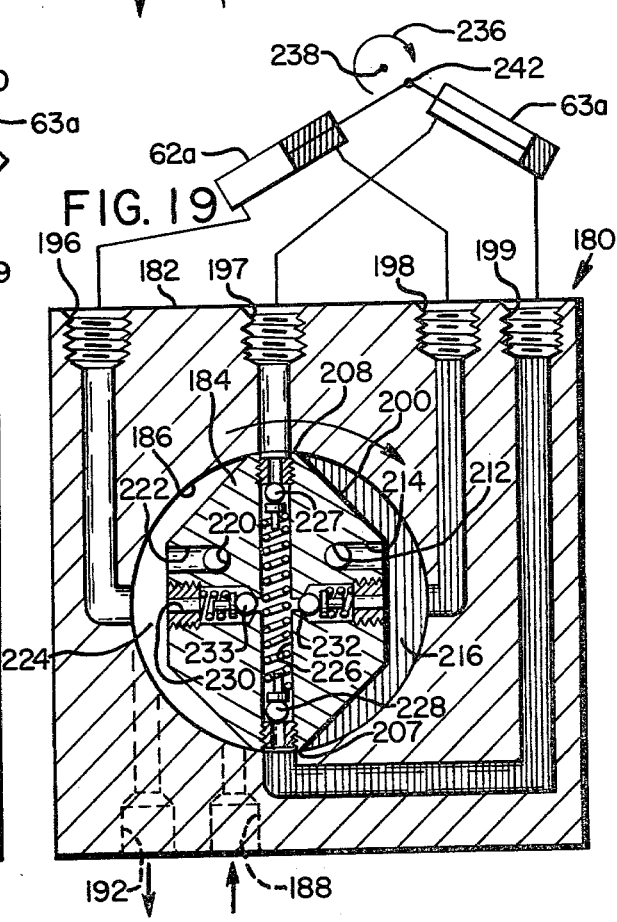
FIG. 19 is a view similar to that of FIG. 18, showing the rotary control valve in a second operating position.

As shown best in FIGS. 18 and 19, distributor portion 200 is of generally octagonal shape in cross section. It provides three adjoining flat recessed surface portions 201, 202, 203 separated from three other adjoining flat recessed surface portions 204, 205, 206 by projecting surface portions 207, 208. Portions 207, 208 slide in contact with the cylindrical wall of bore 186 to divide such bore at the distributor portion into two chambers including a pressure chamber 216 and a relief chamber 224.

Figure 17:
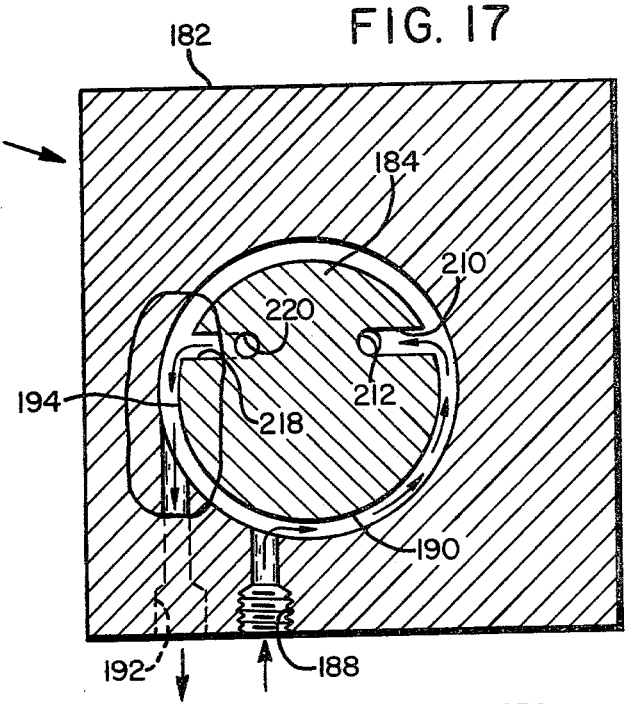
FIG. 17 is a sectional view taken along the Line 17—17 of FIG. 16.

The grooved portion 190 of rotary member 184, as shown in FIG. 17, includes a pressure passage 210 extending inwardly of the groove and intersecting an axial passage 212 extending from groove 190 through the rotor into distributor portion 200 where it intersects another passage 214 opening into the bore at recessed distributor surface portion 202. Thus, fluid under operating pressure admitted into the valve block through pressure passage 188 proceeds through circumferential groove 190, passage 210 and passages 210, 212 and 214 into pressure chamber 216 defined by recessed rotor surface portions 201, 202, 203 to pressurize such chamber and maintain it under a constant operating pressure as it rotates within the bore.

The rotor's annular groove 194 communicates with an inwardly extending fluid passage 218, which connects with an axial passage 220, which in turn connects with a passage 222 in the recessed distributor portion 200 and opens into relief chamber 224 at recessed surface 205. Thus, relief chamber 224 is under constant low pressure communication with relief passage 192 in the valve body.

As rotor 184, and thus its distributor portion 200, rotates, pressure chamber 216 and relief chamber 224 constantly change positions within the bore. As they do so, they successively communicate with the four cylinder passages 196–199, thereby successively pressurizing one side and relieving the other side of both cylinders 62a, 63a, in the sequence necessary to drive the connected gear 36 in rotary paths 236 about its eccentric pivot mountings. In operation, rotor 184 can be driven by connecting it to a rotary element of the rotator assembly such as the pivot pin 44 of the uppermost rotating eccentric mounting means 42 shown in FIG. 2. Pin 44 would rotate by keying it to eccentric pivot 46.

Distributor portion 200 of rotor 184 includes pressure relief valving means. Such means includes a diametric through passage 226 opening at projecting rotor surface portions 207, 208. This passage is normally closed at both ends by ball check valves 227, 228 biased to their closed positions by a spring 229 to prevent flow between the opposite sides of cylinders 62a, 63a. Another diametric passage 230 extends through the distributor portion of the rotor, intersecting the first diametric passage 226 at its center and opening at its opposite ends at recessed rotor surface portions 202 and 205. This passage is normally closed to both such recessed surface portions and thus to the relief and pressure chambers by ball-type relief valves 232, 233, urged to their closed positions by suitable springs 234.

The pressure relief feature is provided to prevent pressure locking of the drive cylinders, which could otherwise occur even with the use of a rotary valve.

In the FIG. 18 position of the rotor 184 there is no pressure-locking problem. Pressure chamber 216 distributes pressure fluid to cylinder passage 197 to pressurize both the secondary side of cylinder 63a and the secondary side of cylinder 62a to induce a counterclockwise rotation of the connected gear in the path 236 about the axis 238 with both cylinders effectively acting at point 240 along such path. At the same time the primary sides of both cylinders are open to communicate with relief chamber 224 through cylinder passages 196, thereby permitting both cylinders to retract. In this phase of the rotor, there is no pressure-locking of the cylinders because both cylinders are actively retracting under power.

However, when rotor 184 rotates to the position shown in FIG. 19, there is a potential pressure-locking problem in cylinder 63a, which is at or near its bottom dead-center position shown. In such position rotor distributor surfaces 207, 208 are indexed with cylinder passages 199, 197, respectively, blocking flow from both sides of cylinder 63a. At the same time, rotor pressure chamber 216 pressurizes the secondary side of cylinder 62a through cylinder passage 198 while relief chamber 224 relieves the primary side of the same cylinder through cylinder passage 196. Cylinder 62a is in very nearly its maximum power position at the point 242 of the rotary drive path 236. Thus, a pressure-locking condition can develop at either side of cylinder 63a as cylinder 62a tries to drive it while the rotor is in a neutral, flow-blocking position with respect to such cylinder. To prevent this, excessive pressure developing at the primary side of cylinder 63a is transmitted through cylinder passage 199 to open rotor check valve 228. The excessive pressure is thus transmitted through rotor passage 226 to lateral rotor passage 230 to act against relief valves 232, 233. Such excessive pressure opens at least relief valve 233, relieving the excessive pressure into the low-pressure relief chamber 224, where it can be exhausted to reservoir through rotor passages 222, 220 and 218, and relief passage 192 in the valve block.

If the excessive pressure should develop at the secondary side of cylinder 63a when the rotor 184 is in the same position as shown in FIG. 19, such excessive pressure is transmitted through cylinder passage 197 to open ball check valve 227, thereby enabling the transmission of such high pressure again through rotor passage 226 to lateral passage 230 to again open relief valve 233 and relieve the excess pressure into relief chamber 224 of the valve bore.

As the rotor continues to rotate within the valve bore to a point where rotor surfaces 207, 208 are indexed with cylinder passages 196, 198, respectively, the same pressure-locking conditions tend to develop in cylinder 62a and are relieved in a manner similar to that just described with respect to cylinder 63a.

From the foregoing description it should be apparent that the pressure-relieved control valving described has application wherever multiple hydraulic cylinders are used to drive a common connected element in a rotary path, such as in rotating a crank or an eccentric plate.

Having illustrated and described the principles of our invention in a preferred embodiment and several alternative embodiments, it should be apparent to those persons skilled in the art that such embodiments may be modified in design, arrangement and detail without departing from such principles.

We, therefore, claim as our invention all such modifications as come within the true spirit and scope of the following claims:

1. In a rotator attachment for a lift truck of the type including an inner gear means with external teeth and surrounding outer gear means with a greater number of internal teeth engaging said external teeth, the teeth of both gear means being in surrounding relationship to an axis of rotation, one of the gear means being mounted by rotational mounting means for rotation about said axis for rotating a connected load, the other gear means being mounted by eccentric mounting means to a frame for movement in a gyratory eccentric path about said axis to rotate said one gear means about said axis;
   a drive means for moving said other gear means in said gyratory eccentric path comprising:
   multiple hydraulic cylinders connected at one set of ends to said frame and at their opposite set of ends to said other gear means at an angular relationship to one another,
   position-responsive control valve means responsive to the position of said other gear means in its said gyratory eccentric path for controlling sequentially the flow of hydraulic fluid under operating pressure to said multiple cylinders,
   and fluid pressure-responsive relief valve means in association with said control valve means and operable in response to a predetermined excessive fluid pressure in any of said hydraulic cylinders to relieve said excessive pressure and prevent pressure-locking therein.

2. Apparatus according to claim 1 wherein said relief means relieves said excessive pressure through said control valve means.

3. Apparatus according to claim 1 wherein said control valve means comprises a separate control valve for each said cylinder, said separate control valve including a valve member mounted within its associated said cylinder for relative movement between said valve member and associated cylinder.

4. Apparatus according to claim 3 wherein said relief valve means comprises a separate relief valve means for each said cylinder, each said separate relief valve means including a movable relief valve member movably mounted within its associated said cylinder.

5. Apparatus according to claims 1, 2 or 4 wherein said relief valve means comprises a portion of said control valve means.

6. Apparatus according to claim 1 wherein said control valve means comprises a control valve body and control valve member movable relative to one another, said relief valve means including a movable relief valve member movably mounted within one of said control valve body and valve member.

7. Apparatus according to claim 1 wherein said control valve means comprises a three-position spool valve for each cylinder including a valve spool, said cylinder including a cylinder base including a spool cavity for receiving said valve spool, a piston chamber, a piston movable within said chamber, and cylinder fluid passage means extending from said spool cavity to said chamber at the primary and secondary sides of said piston, said valve spool being mounted in said cavity for relative movement between said spool and said base.

8. Apparatus according to claim 7 wherein said valve spool includes an end portion projecting from said base and pivotally connected to said frame, said base being pivotally connected to said frame and said piston including a piston rod pivotally connected to said other gear means.

9. Apparatus according to claims 1 or 7 wherein said control valve means includes a three-position valve spool operable in a first neutral position to block communication between a source of fluid under operating pressure and both sides of the associated said cylinder, operable in a second operating position to connect said source to one side of said associated cylinder and operable in a third position to connect said source to the opposite side of said associated cylinder, said relief valve means including a movable portion of said valve spool in communication with said cylinder and movable in said neutral position in response to excessive pressure in said cylinder to relieve said excessive pressure through said valve spool.

10. A rotator attachment for rotating a load-handling mechanism on a lift truck about an axis, said attachment comprising:
   a frame,
   an inner gear means with a predetermined number of external teeth in surrounding relationship to said axis,
   an outer gear means surrounding said inner gear means and with internal teeth in greater number than said predetermined number of external teeth and adapted to engage said external teeth,
   mounting means mounting one of said gear means on said frame for rotation about said axis;
   attaching means on a front face of said one gear means for attaching said load-handling mechanism thereto,
   eccentric mounting means mounting the other said gear means to said frame for movement in a gyratory eccentric path about said axis such that movement of said other gear means in said path rotates said one gear means about said axis, said eccentric mounting means including three said eccentric mounting means symmetrically arranged about said axis and interconnecting said other gear means and said frame, a pair of double-acting hydraulic cylinders angularly disposed to one another and connected at one set of ends to said frame at opposite sides thereof and at an opposite set of ends to said other gear means adjacent to and on opposite sides of one of said eccentric mounting means in positions such that extension and retraction of said pair of cylinders in predetermined sequence rotates said other gear means on said three eccentric mounting means in said gyratory eccentric path, position-responsive control valve means responsive to the position of said other gear means in said gyratory eccentric path for operating said cylinders in said sequence, said control valve means including a neutral position normally blocking flow of fluid to and from said cylinders, and pressure-responsive relief valve means sensitive to the fluid pressure in said cylinders and operable in the neutral position of said control valve means in response to an excessive fluid pressure at either side of either said cylinder to relieve said excessive pressure to a fluid reservior.

11. Apparatus according to claim 10 wherein said inner gear means is mounted for rotation about said axis and said pair of cylinders are connected to said outer gear means.

12. Apparatus according to claim 10 wherein said control valve means comprises a pair of valve spools one mounted within a base portion of each said cylinder, each said spool being connected at one end to said frame and being movable through said neutral position between operating positions upon oscillation of said cylinders.

13. Apparatus according to claim 12 wherein said relief valve means comprises a pair of relief valve means one mounted within a base portion of each said cylinder for cooperation with said spools.

* * * * *

UNITED STATES PATENT AND TRADEMARK OFFICE
CERTIFICATE OF CORRECTION

PATENT NO. : 4,198,189

DATED : April 15, 1980

INVENTOR(S) : RONALD A. BRUDI and DANIEL F. CHASE

It is certified that error appears in the above-identified patent and that said Letters Patent are hereby corrected as shown below:

Column 2, line 13, change "a" to --as--;

Column 2, line 13, change "cyliners" to --cylinders--;

Column 5, line 23, change "provided" to --pivoted--;

Column 7, line 16, change "Nut 10" to --Nut 110--;

Column 7, line 25, change "annularshoulders" to --annular shoulders--;

Column 8, line 47, change "wherebyexcessive" to --whereby excessive--;

Column 9, line 16, change "centeredneutral" to --centered neutral--;

Column 11, line 43, between "rotary" and "member" insert --valve--;

Column 12, line 7, change "such" to --much--;

Column 12, line 36, change "communicate" to --communication--.

Signed and Sealed this

Twenty-fifth Day of November 1980

[SEAL]

Attest:

SIDNEY A. DIAMOND

*Attesting Officer*   *Commissioner of Patents and Trademarks*